United States Patent [19]

Miller

[11] Patent Number: 4,898,349

[45] Date of Patent: Feb. 6, 1990

[54] SPACECRAFT APPROACH/SEPARATION BY USE OF ANGULAR MEASUREMENT

[75] Inventor: Paul A. Miller, East Windsor, N.J.

[73] Assignee: General Electric Company, East Windsor, N.J.

[21] Appl. No.: 282,161

[22] Filed: Dec. 9, 1988

[51] Int. Cl.$^4$ .............................................. B64G 1/24
[52] U.S. Cl. ................................... 244/161; 244/176; 244/3.16
[58] Field of Search ................... 244/158 R, 164, 161, 244/172, 176, 3.1, 3.15, 3.16, 3.17, 3.18; 364/459, 434, 424

[56] References Cited

PUBLICATIONS

"Terminal Guidance System For Satellite Rendezvous" by Clohessy et al., published in the Journal of the Aerospace Sciences, Sept. 1960.
"Safe Rendezvous Approach To A Space Station By Impulsive Transfers And Continuous Thrust Arcs" by Eckstein, published by the AAS/AIAA Astrodynamics Specialist Conference held Aug. 10–13, 1987.

*Primary Examiner*—Galen Barefoot
*Attorney, Agent, or Firm*—William H. Meise

[57] ABSTRACT

An intermediate-distance method for approach or separation of a spacecraft relative to a target vehicle is used in a range of distances of a few meters to a few tens of kilometers when the vehicles are in coplanar low Earth orbits. The method establishes a local horizontal at one vehicle, and propulsion is applied to maintain a line between the target vehicle and spacecraft at a constant angle relative to the local horizontal. The method is particularly attractive for use when the only information conveniently available is bearing (angle) and possibly bearing rate. When the orbits are not coplanar, thrust is applied in the cross-orbital-plane direction with an amplitude which is a maximum at the moment that one spacecraft lies in the orbital plane of the other.

11 Claims, 9 Drawing Sheets

SPACECRAFT APPROACH/SEPARATION BY USE OF ANGULAR MEASUREMENT

The U.S. Government has rights in this invention pursuant to National Aeronautics and Space Administration Contract NAS5-29400.

BACKGROUND OF THE INVENTION

This invention relates to guidance systems for guidance of spacecraft to or from rendezvous.

It may often be desirable to cause one spacecraft to approach (or leave) another spacecraft from a substantial distance to a relatively close distance in order that the spacecraft may then be docked. An example of such an approach and separation might relate to refueling or repair of a low earth orbiting satellite. If fuel should be depleted or a failure should occur in a replaceable module of such a satellite, a manned space shuttle or possibly an unmanned repair vehicle might reach it. Under such circumstances, docking might occur, or it might well be that no actual docking of the space shuttle with the communications satellite would be necessary, as extravehicular activity (EVA) could be used to effect the fueling or repairs. The repaired satellite could then be returned to its operational orbit.

It is very desirable to use a television camera or other imaging device as the sensor for approach and docking navigation, for the camera provides information relative to target attitude as well as to overall visually determinable conditions such as improperly deployed appendages, broken pieces, intervening objects, potential collisions and the like.

When a maneuvering spacecraft and a target vehicle are in relatively close proximity, the camera can provide information regarding the distance therebetween. In particular, the distance can readily be determined by triangulation between the camera's point of observation on the observing spacecraft and two or more locations on the target vehicle which have known separations. Under such conditions, well known control systems and techniques may be used to effect docking or separation of the vehicles. Depending upon the size of the target vehicle, there will be a distance at which the apparent separation of locations on the vehicle is so small that they either cannot be separately resolved at all, or, if they can be resolved, the error in the triangulation is too large for an accurate determination of distance. At such distances, it is customary to use an auxiliary means such as radar to determine the inter-vehicle distance.

An improved medium-distance approach or separation apparatus and method is desired.

SUMMARY OF THE INVENTION

A method for controlling the approach or separation of a spacecraft in a first orbit about a heavenly body relative to a target in a substantially coplanar orbit about the heavenly body includes the step of determining the direction of a radius from the center of gravity of the heavenly body to at least one of the spacecraft and the target. This simply amounts to determining the local vertical. A second direction which is substantially parallel with the mutually coplanar orbits and normal to the direction of the radius is determined. In effect, this is simply the determination of local horizontal. From one of the vehicles, the angle which lies within the common orbital plane and between the local horizontal and the other vehicle is determined. Propulsion is applied to one of the vehicles to maintain a constant angle.

According to another aspect of the invention, thrust is provided which is directed to oppose the apparent direction of motion of one of the vehicles (as viewed from the other) in a direction perpendicular to the orbital plane, so as to make the orbital planes substantially parallel. The thrust is a maximum at the time at which the cross-plane bearing angle is 0°.

DESCRIPTION OF THE INVENTION

Figure 1:
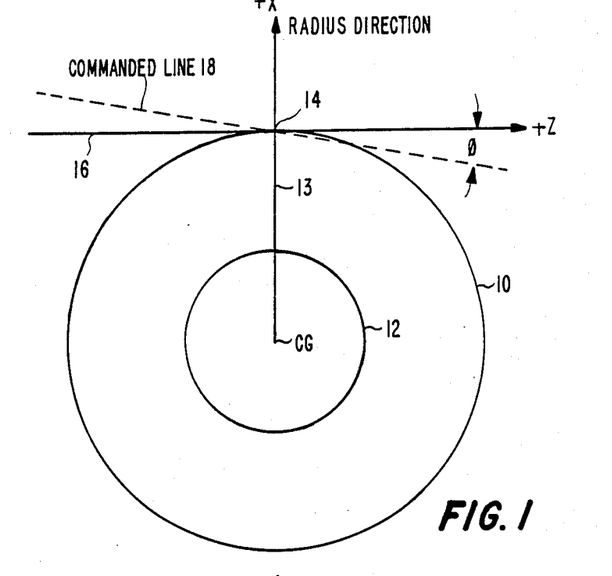
FIG. 1 is a view of the Earth illustrating an orbit with a moving coordinate system and a commanded plane in accordance with the invention.

FIG. 1 illustrates a plan view of a circular orbit path designated 10 about a heavenly body 12 such as the Earth, having a center of gravity CG. A coordinate system includes a radial direction indicated by +X which intersects orbit 10 at a point 14. The coordinate system includes a line 16 which is coplanar with orbit 10 and normal to radius direction +X, and which intersects radius direction +X at point 14, thereby being tangent to orbit 10. The +Z direction is indicated by an arrow pointing to the right. Also indicated in FIG. 1 is a commanded line 18 lying in a plane orthogonal to the orbital plane and making an angle $\phi$ with Z axis 16.

In accordance with the invention, two space vehicles (not illustrated in FIG. 1), denominated a "spacecraft" and a "target vehicle" or "target" are located at or near point 14 at the intersection of the X and Z axes of the coordinate system, and the approach of the spacecraft to the target vehicle is accomplished by control so as to make one vehicle maintain a constant angle $\phi$ relative to the other.

Figure 2:
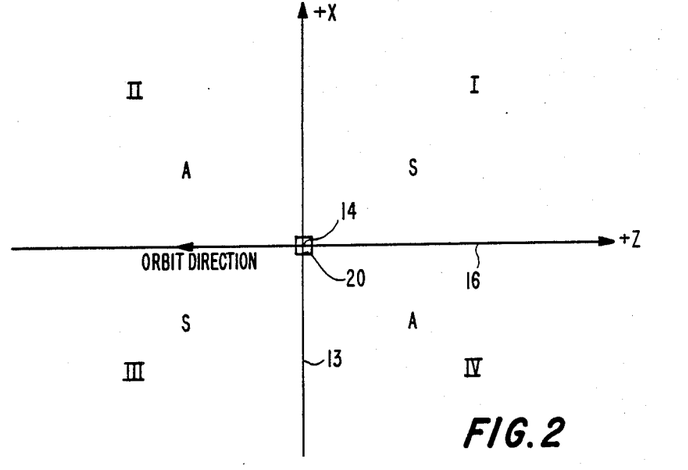
FIG. 2 illustrates a target vehicle at the origin of the moving coordinate system of FIG. 1, illustrating orbit directions, and relative approach and separation quadrants.

FIG. 2 is a more detailed view of the region of FIG. 1 lying near intersection 14 between the X direction radius line 13 and the Z direction tangent line 16. As illustrated, a vehicle illustrated as 20 lies at the origin at the coordinate system. As will be described, the underlying assumptions upon which the inventive navigation method and apparatus are predicated are that the space vehicles are so close together that, at least in the overall view illustrated in FIG. 1, both vehicles may be considered to be at point 14, i.e. both lie at the same radius from CG and are substantially coplanar. In FIG. 2, however, one or the other of the vehicles 20 is illustrated as being actually centered at point 14, and the other vehicle (not illustrated in FIG. 2) lies in one of four quadrants I, II, III or IV, relative to vehicle 20. As illustrated in FIG. 2, quadrants I and III are designated by the letter S, and quadrants II and IV are designated by the letter A. Letter S represents separation, indicating that the two vehicles will tend to separate if maintained in quadrants I and III with one vehicle having a constant bearing angle as viewed from the other, whereas in quadrants II and IV the vehicles will tend to approach under these same conditions.

The approach and separation indicated in FIG. 2 may be readily understood by considering the orbit direction illustrated by the arrow designated "orbit direction," which is directed in the $-Z$ direction. A vehicle in quadrant II and not actually on line 16 is ahead of vehicle 20 and at a higher altitude. A vehicle in a higher altitude will have a longer period T which is proportional to $\sqrt{(a^2/\mu)}$, where a is the orbit semi-major axis and $\mu$ is the gravitational constant. The vehicle in quadrant II consequently moves the left more slowly than does vehicle 20, and they are, as a consequence, relatively approaching. Similarly, a vehicle located in quadrant I is at a higher orbital altitude than is target 20, and consequently it is moving to the left with a lower orbital speed, and therefore the vehicles are mutually separating. A vehicle located in quadrant III relative to vehicle 20 is at a lower altitude and ahead of target 20, and its higher orbital velocity results in relative separation. A vehicle located in quadrant IV has a higher velocity than vehicle 20, and is behind, so that they are becoming nearer or approaching.

Figure 3A:
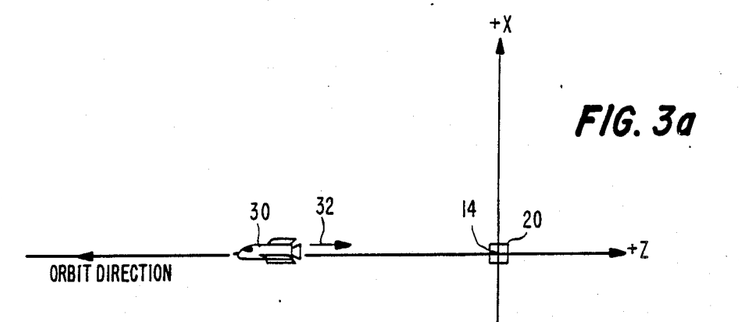
FIGS. 3A, 3B and 3C together illustrate an approach method which fails.
Figure 3B:
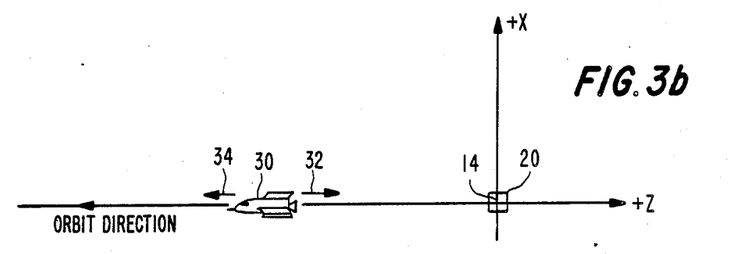
Figure 3C:
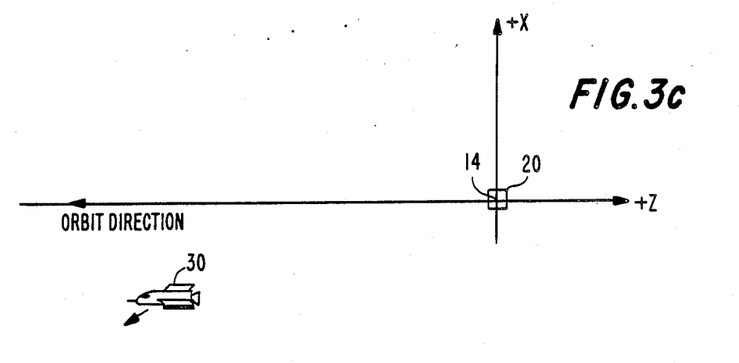

FIG. 3A illustrates an X-Z coordinate system with a target vehicle 20 at the origin 14, and with a maneuvering spacecraft 30 located on the Z axis displaced from origin 14 in the orbital direction. Since the X position or altitude of vehicles 20 and 30 is the same as illustrated in FIG. 3a, their orbital velocities are essentially identical. Consequently, under the conditions described, vehicles 20 and 30 remain at the same relative distance, although both are traveling in the orbital direction $-Z$. To initiate a rendezvous between vehicles 20 and 30, it might be desired to move vehicle 30 in the direction of arrow 32 toward vehicle 20. It might be thought that this could be accomplished by firing a thruster in the direction of arrow 34 as illustrated in FIG. 3B, thereby causing a reactive force which would accelerate the vehicle in direction 32 toward target 20. However, what actually happens under such conditions is illustrated in FIG. 3C. As illustrated in FIG. 3C, the firing of a thruster in the direction indicated in FIG. 3B reduces the orbital energy, thereby causing vehicle 30 to drop to a lower orbit which, by reference to FIG. 2, can be seen to be in the third quadrant, which thereby causes separation of the vehicles rather than rendezvous.

Figure 4:
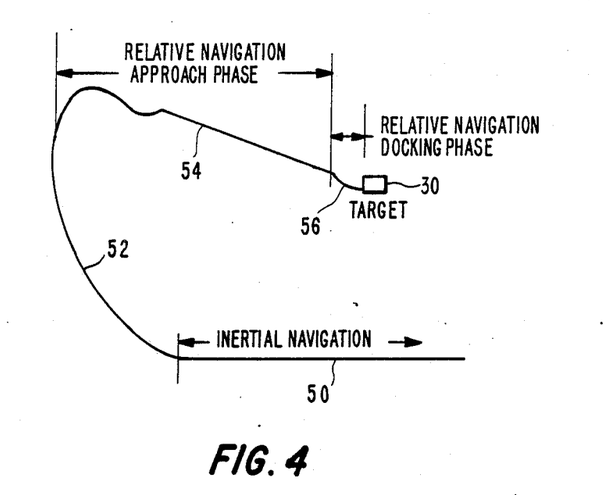
FIG. 4 illustrates a general view of an orbital plane and an approach in accordance with the invention.

FIG. 4 illustrates a docking operation including an approach or rendezvous phase in accordance with the invention. In FIG. 4, a first portion of the path or trajectory illustrated as a line 50 in FIG. 4 is controlled in known manner, as by inertial navigation, involving the use of ground tracking, celestial sensors, Global Positioning System, or other means as required. While line 50 is illustrated as carrying the maneuvering spacecraft at a lower altitude than the target spacecraft, the inertial navigation phase may also be at the same altitude or at a higher altitude. Thrusters are fired in order to carry the maneuvering spacecraft along a path illustrated as 52 which moves the maneuvering spacecraft into an appropriate one of the quadrants relative to target 20 as required for separation or approach. As illustrated in FIG. 4, path 52 carries the maneuvering spacecraft into the second quadrant, thereby providing for an approach. The distance from the target should not be so great that the target cannot be seen by the camera. Once an orbit in the second quadrant is achieved, an approach is initiated as illustrated by a path or trajectory 54, which is continued to a region which is relatively close to target, where upon a transition is made to an approach path illustrated as 56 which is controlled in known docking mode.

Figure 5:
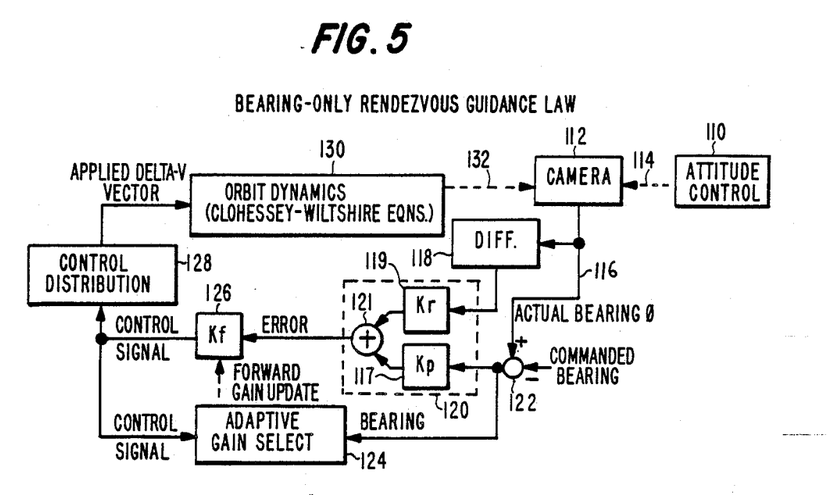
FIG. 5 illustrates a control system in accordance with the invention.

FIG. 5 illustrates in simplified block form a control system utilizing a known attitude control system 110 for determining the local vertical, which corresponds to the X axis described in conjunction with FIGS. 1, 2 and 3, and which also establishes, by the use of horizon sensors or by other means, the local horizontal plane, in which the Z axis lies. A camera illustrated as 112 is used for the relative navigational phase in accordance with the invention. Camera 112 is stabilized relative to the horizontal plane, as suggested by dashed line 114. Line 114 may simply represent a camera mounted to look along the horizontal plane in a vehicle, the horizontal plane of which is stabilized by attitude control system 110. As an alternative, the camera may be directed so as to be centered on the target vehicle, with the angle of the target relative to the horizontal plane established by attitude control system 110 being indicated by the signal from an angle sensor. In any case, camera 112 looks along the substantially common plane in which both the vehicles lie and produces information relative to the actual bearing angle $\phi$ relative to the Z axis (FIG. 1). This information is applied to a rate-of-change determining apparatus illustrated as a differentiator block 118, which produces bearing angle rate-of-change information which is applied as a first input to position (117) and rate (119) feedback circuits together with an adder 121, illustrated together as a block 120. The actual bearing angle information from camera 112 is also applied to a differencing circuit 122 which receives the commanded bearing from a source such as a keyboard (not illustrated) described in more detail below. The actual bearing is compared with the commanded bearing in differencing circuit 122, and the difference is applied as a second input to a position and rate feedback circuit block 120 and as a first input to an adaptive gain selecting circuit 124. Position and rate feedback circuit 120 processes the input signals to produce an error signal. The error signal is generated within block 120 by multiplying the differentiated signal from differentiator 118 by a constant $K_p$ in a multiplier 119, multiplying the bearing information from differencing circuit 122 by a constant $K_p$ in a multiplier 117, and summing the results of the multiplications in an adder 121. The resulting error signal is applied to a controlled multiplier 126 which is gain controlled by selector 124. The resulting amplitude-modulated or gain-controlled signal is applied from multiplier 126 as a second input to gain selector 124. The control signal represents thrust amplitude and direction information, which is resolved by a control distribution function illustrated as a block 128 which operates the appropriate thrusters. The thrusters cause a change of velocity in a preselected direction.

In FIG. 5, the orbital dynamics which, in response to thrust, cause changes in the separation of the maneuvering spacecraft relative to the target, are illustrated as a further block 130. Such a block is advantageous for performing computer simulations to verify and optimize control in accordance with the invention. The orbital dynamics affect the view seen by camera 112, as suggested by dashed line 132, thereby closing the loop. The purpose of active control of the gain provided by block 126 in response to selection block 124 is simply to control the magnitude of the thruster action in proportion to the difference between the actual and the commanded bearing.

Figure 6A:
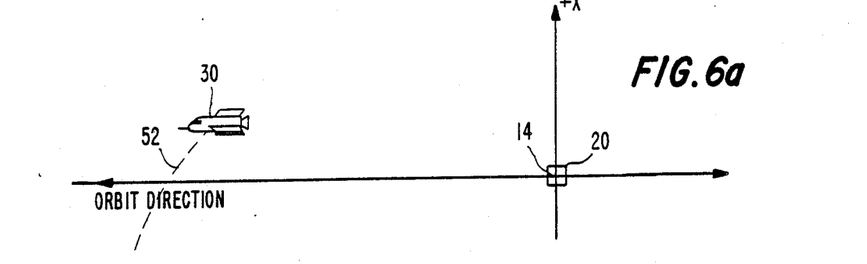
FIGS. 6A, 6B and 6C, referred to together as FIG. 6, illustrate an approach method in accordance with the invention.

FIG. 6A illustrates the initial position of a maneuvering spacecraft 30 relative to a target 20, both orbiting the Earth in the $-Z$ direction. At the instant illustrated in FIG. 6A, spacecraft 30 has arrived after the maneuver indicated by path 52 of FIG. 4 at a position of $Z = -2,000$ meters (m) and an altitude of about 260 m relative to target 20. The altitude of both spacecraft above CG (FIG. 1) is about 7,000 kilometers (km). The motion of target vehicle 20 about the heavenly body is about 0.01 radians per second, which represents an orbital period of about 100 minutes. The initial relative velocity in the vertical or X direction of the maneuvering spacecraft about 0.3 m/sec, and its initial relative velocity in the $+Z$ direction is about 0.7 m/sec. The commanded bearing $\phi = 7.5°$. For the sake of completeness in defining the example, the position gain is set to 0.001 and the rate gain is set to unity, the control feedback unit vector in the Z direction is set to equal $-0.707$ and in the X direction $+0.707$, respectively. The limits in meters per second for the position and rate control are 1E-002 and 0.1, respectively. At a range of approximately 2,000 meters, the target vehicle will be visible, but discrete points on target vehicle 20 are likely not to be visible, and therefore the range is not known. However, an approach at a constant bearing angle $\phi$, as described, provides a relatively rapid approach at large distances, with a decreasing relative approach rate or velocity at closer ranges.

Figure 6B:
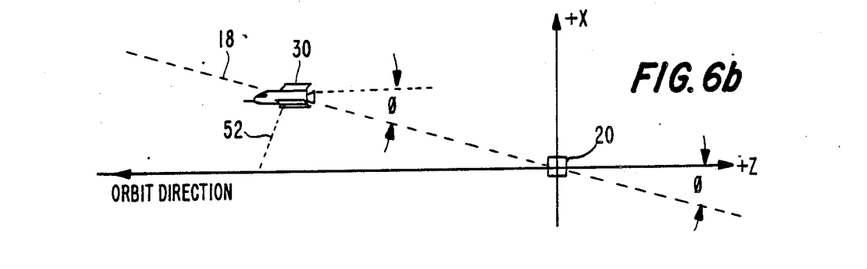
Figure 6C:
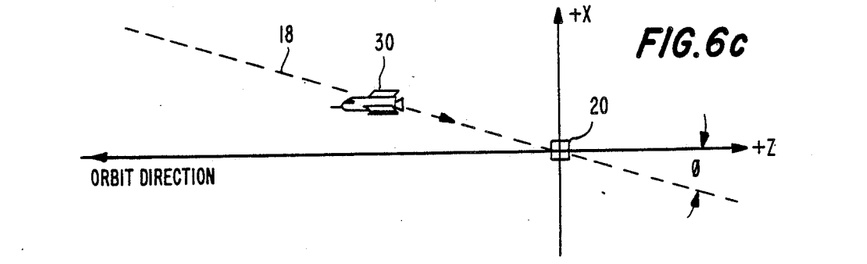

At an instant illustrated in FIG. 6b, maneuvering spacecraft 30 reaches the illustrated position, at which the bearing $\phi$ of the target vehicle is the commanded bearing relative to local horizontal, in this example $-7.5°$. At this moment, the control system illustrated in FIG. 5 is closed. As described below, this may result in transient errors as the loop settles, but the principal portion of the approach is as illustrated in FIG. 6C, with the maneuvering spacecraft moving toward target vehicle 20 along a line 18 lying in a commanded plane perpendicular to the orbital plane.

Figure 7:
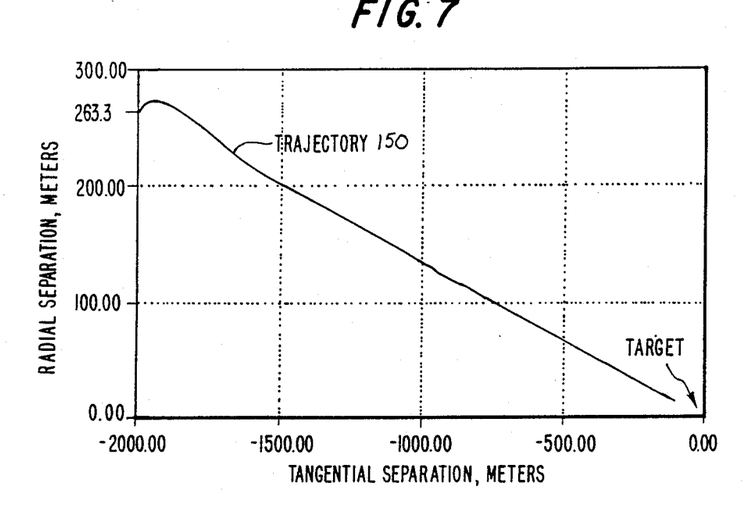
FIG. 7 represents a trajectory which results from a computer simulation of a portion of the approach of FIG. 6 using the control system of FIG. 5.
Figure 8:
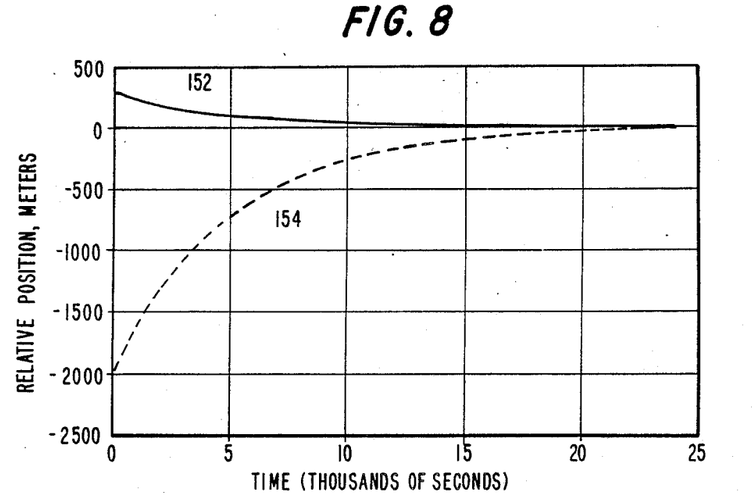
FIG. 8 represents computer plots of the X and Z components of relative position corresponding to the trajectory of FIG. 7.

FIG. 7 illustrates a trajectory 150 as the relative separation (range), measured in meters, with tangential and radial position components. As illustrated, the initial position occurs at the left at a relative separation of approximately 260 meters radially and $-2,000$ meters tangentially. The left end of trajectory 150 represents the position of the maneuvering spacecraft relative to the target at the time at which the control loop illustrated in FIG. 5 is closed. The computed trajectory 150 shows that the relative altitude momentarily rises in a transient manner from 263.3 to about 270 meters, and then decreases in an approximate proportion to decreasing range toward the target. FIG. 8 includes the information provided in FIG. 7, plotted against time. Solid-line plot 152 of FIG. 8 represents relative X-direction separation versus time, and dashed-line plot 154 represents Z-axis separation versus time. As can be seen, very close approach (less than 50 meters) occurs after about 20,000 seconds (333 minutes). Thus, close approach in this example occurs within slightly more than three complete orbits at an orbital period of about 100 minutes.

Figure 9A:
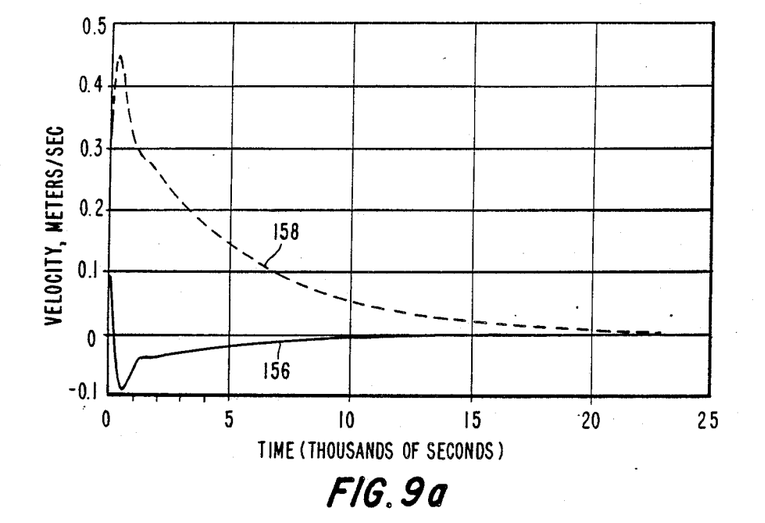
FIG. 9A illustrates plots of the X and Z components of velocity, and 9B illustrates plots of velocity angle and bearing angle, both relating to the simulation giving the trajectory of FIG. 7.
Figure 9B:
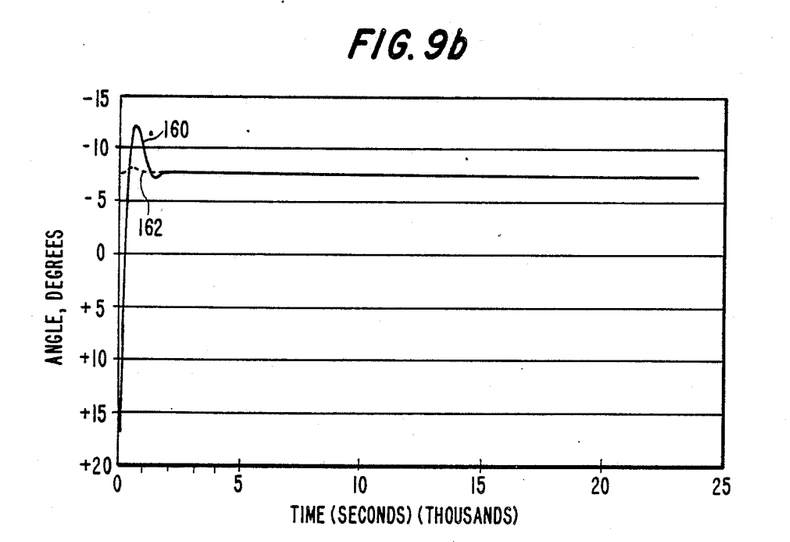

As can be seen by reference to plot 154, the range changes relatively quickly over the first 5,000 seconds and more slowly in the range of 15,000 to 20,000 seconds. Thus, the method of relative approach by constant bearing angle controls relative approach velocity in inverse relationship to range even when range cannot be determined. FIG. 9A illustrates a solid-line plot 156 of X-direction velocity as a function of time, and a dashed-line plot 158 representing Z-axis velocity magnitude as a function of time. As illustrated by plot 156, the initially slight positive (in the $+X$ direction) velocity decreases rapidly and passes through an overshoot region during the first thousand seconds of the approach, and then stabilizes to a decreasing negative value thereafter. The Z-direction velocity represented in FIG. 9A by dashed line 158 similarly overshoots in the positive direction, and then decreases with increasing time so that the velocity magnitude is very low when the maneuvering spacecraft is near the target is very low. Solid-line plot 160 of FIG. 9B represents the velocity angle, which is the angle whose tangent is the X velocity 156 of FIG. 9A divided by the Y velocity 158. For example, the value represented by plot 156 of FIG. 9A at 3,000 seconds is $-0.028402$ m/sec, and the value of Z-velocity plot 158 is $= +0.214378$ m/sec, which defines an angle of $-7.5°$. This means that the velocity vector of the maneuvering spacecraft is directed in the direction of arrow 31 of FIG. 6C, toward the target spacecraft. Dotted-line plot 162 of FIG. 9B represents the bearing angle of the target as seen from the maneuvering spacecraft. As illustrated, the bearing angle varies somewhat around the desired $-7.5°$ value during the initial transient period of operation.

Figure 10:
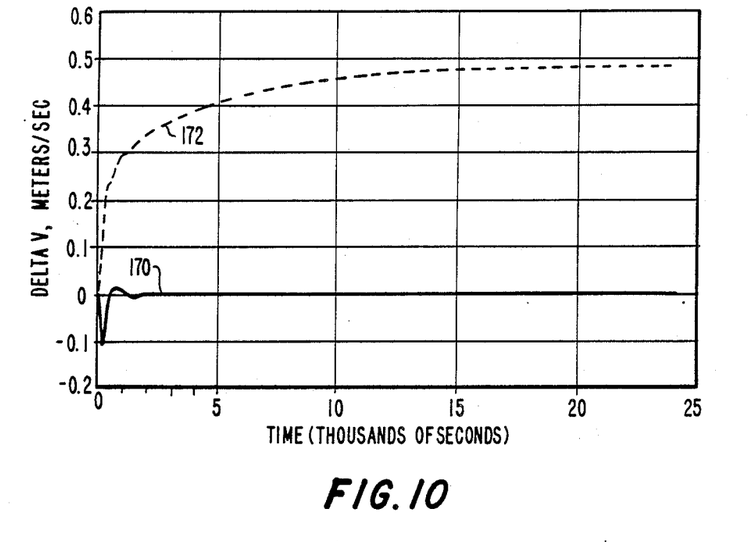
FIG. 10 illustrates plots of velocity change relating to the simulation providing the trajectory of FIG. 7.

Solid-line plot 170 of FIG. 10 represents the instantaneous applied change in velocity ($\Delta V$). At a time of 3,000 seconds, the instantaneous $\Delta V$ is $-0.002605$ m/s, and the value decreases with increasing time. Dashed-line plot 172 represents the total change in velocity or total $\Delta V$.

The described constant-angle approach or separation method provides a relatively large velocity at large separations, decreasing to a low velocity at small separations without the need for range-measuring equipment. The only sensing equipment required is that obtainable by direct view or by a camera. The method is usable at ranges greater than those ranges at which the target is close enough so that separated points on the surface can be accurately resolved, i.e., greater than ranges at which it is likely that docking procedures will be used. The maximum distance at which the described constant angle approach method is useful is the lesser of the maximum distance at which the target can be seen at all, and the maximum distance at which excessive errors occur. In general, when the target spacecraft and the maneuvering spacecraft are separated by a distance which is about equal to 0.01 to 0.001 of the orbital radius (for example, 7 to 70 km for an orbital radius of 7,000 km) even two vehicles which are at the same orbital radius (same altitude) will have an apparent angle φ which is nonzero. So long as the commanded angle φ is greater than the apparent angle φ attributable to the separation, the method will still work.

As so far described, the maneuvering spacecraft included attitude sensors and controls, a camera, control circuits and thrusters. The described method will work even if the angle is observed and controlled from one of the spacecraft while the thrusters are on the other spacecraft, as the motion is relative.

Figure 11:
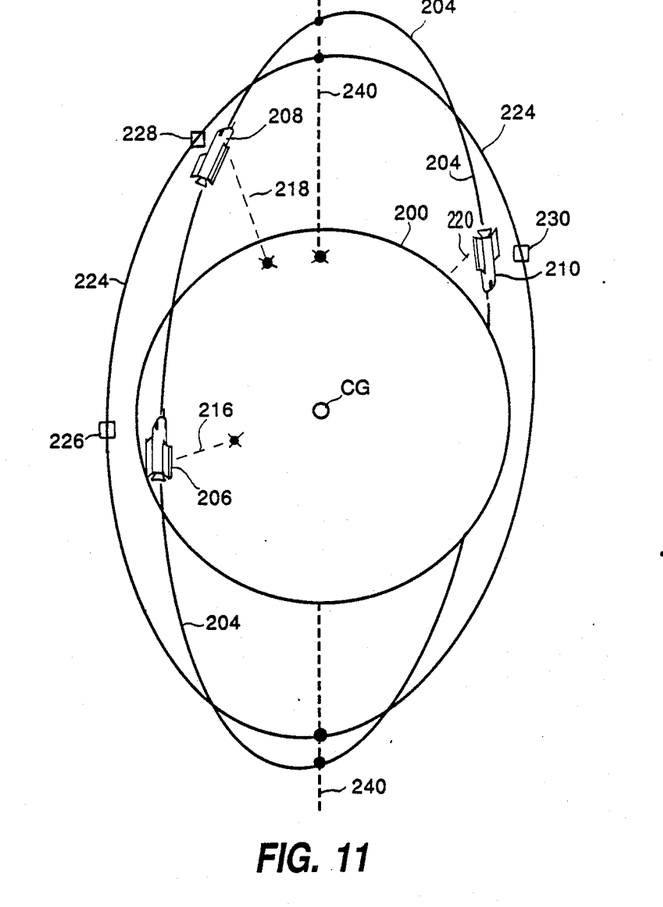
FIG. 11 is a perspective or isometric view of a spacecraft and a target vehicle in orbits which are not quite coplanar.

As so far described, the maneuvering and target spacecraft were in coplanar or substantially coplanar orbits. FIG. 11 is a perspective or isometric view of a spherical heavenly body 200 having a center of gravity CG. A first spacecraft makes an orbit 204 essentially about CG and assumes successive positions illustrated as 206, 208 and 210, which make radii 216, 218 and 220 to CG. Orbit 204 is circular or near-circular. A target vehicle is in a relatively elliptical orbit 224 about CG, and assumes sequential positions 226, 228 and 230 on orbit 224. Since orbits 204 and 224 are not coplanar, they cross at oppositely located points, i.e., along a diameter 240 which extends from CG to orbit 204 and which intersects orbit 224 and which also intersects orbits 204 and 224 on the other (bottom) side of CG. Assuming that the maneuvering and observing spacecraft follows orbit 204 and the target spacecraft follows orbit 224 slightly ahead of the maneuvering spacecraft, the target spacecraft at position 226 will appear to be at an angle to the left of the orbital plane of the maneuvering vehicle located at position 206. Somewhat later, the maneuvering and observing spacecraft will be at location 208 on orbit 204, and the target will be at location 228 on orbit 224. At this second location, the target vehicle will appear to the maneuvering and observing spacecraft to be to the left of the plane of orbit 204 by a lesser angle. When the maneuvering and observing spacecraft is at location 210 on orbit 204 and the target spacecraft is at location 230 on orbit 224, the maneuvering and observing spacecraft will observe the target as being at an angle to the right of the plane of orbit 204. The target vehicle will appear to be exactly in the plane of orbit 204 when located on diameter 240, which occurs twice during each orbit (at the top and at the bottom of FIG. 11). The target will therefore appear cross from left to right and back to left during each complete orbit of the maneuvering and observing spacecraft. As seen by a camera aboard the maneuvering and observing spacecraft, over a period of several orbits the target spacecraft will go from the left to on-center, which will occur on diameter 240, and will then swing to the right and back to on-center. According to another aspect of the invention, the orbits can be rendered coplanar by applying thrust to one of the vehicles in a direction which counters the apparent direction of motion, the thrust being applied in proportion to the derivative or rate of change of the apparent out-of-plane angle. The thrust may be applied continuously with variable magnitude, it may be applied with constant magnitude but with an on-off duty cycle to simulate variable magnitude, or it may be applied as a single pulse at the time at which the target vehicle crosses the observing vehicle's orbital plane.

Figure 12:
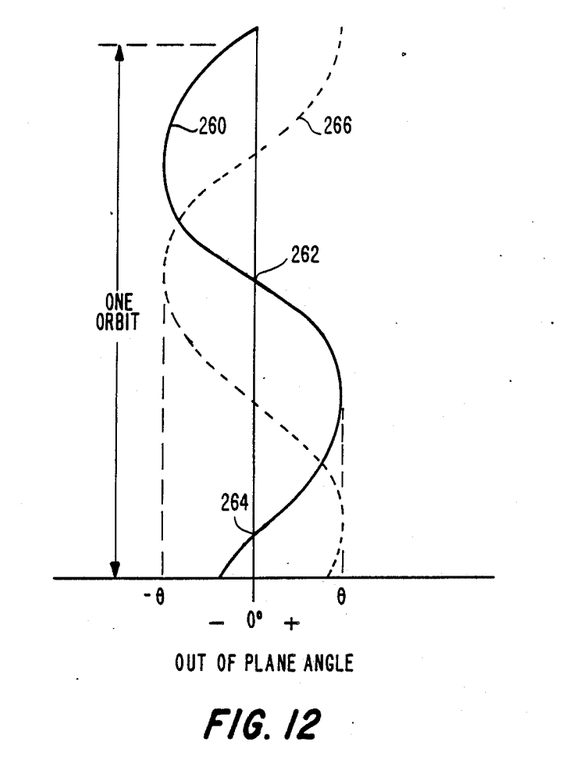
FIG. 12 illustrates the apparent out-of-plane bearing angle over more than one orbit.

Solid-line plot 260 of FIG. 12 represents the angle of the target vehicle relative to the maneuvering vehicle when both are following orbits as illustrated in FIG. 11. As illustrated in FIG. 12, the relative angle is zero at points 262 and 264 of FIG. 12. Plot 260 is sinusoidal. Dashed-line plot 266 represents the rate of change or derivative of plot 260. In accordance with an aspect of the invention, the thrust provided to make the orbits 204 and 224 coincident is applied with a maximum value at the moment when the target vehicle is at a relative 0° bearing in the cross-plane or out-of-plane direction relative to the maneuvering spacecraft, corresponding to positions 262 and 264 of FIG. 12. This also corresponds to the moments at which the derivative 266 has its maximum value. Thrust provided during the peak of the derivative in this fashion occurs at the most efficient time for rendering the orbits coplanar. The thrust is directed in a direction which opposes the apparent relative motion, as for example thrust could be applied to the target vehicle in orbit 224 of FIG. 11 near the moment at which it crosses diameter 240 at the upper part of the FIGURE, and in a direction tending to push the target vehicle toward the left of its orbital path, since its apparent direction of motion is left-to-right. If the thrust were to be applied to the maneuvering spacecraft at the same orbital position, it would be directed to force the spacecraft to the right of its orbital direction. In accordance with yet a further aspect of the invention, thrust is provided (in a direction which opposes the rate of change of bearing) in proportion to the derivative of the out-of-plane angle.

When an approach is performed over a period of several orbits, there is ample opportunity at the observing spacecraft to determine and record the cross-plane angle and establish the rate of change of the angle, so that thrusting may be made continuously in proportion to the derivative.

What is claimed is:

1. A spacecraft guidance and control system for approach/separation relative to a target, both of which are in substantially mutually coplanar orbits about a heavenly body, said spacecraft comprising:
   first attitude determining means for determining the direction of a radius from the center of gravity of said body to at least one of said spacecraft and said target;
   second attitude determining means for determining a direction parallel with at least one of said coplanar orbits and normal to said direction of said radius;
   sensing means coupled to said second attitude control means for sensing the angle in said plane between said direction and a line joining said target with said spacecraft; and
   propulsion means coupled to said sensing means for generating propulsion tending to maintain said in-plane angle at a constant value.

2. A system according to claim 1 wherein said first and second attitude determining means and said sensing means are mounted on said spacecraft.

3. A system according to claim 2 wherein said propulsion means are mounted on said spacecraft.

4. A system according to claim 1 wherein said sensing means comprises a camera.

5. A method for controlling the approach or separation of a spacecraft in a first orbit about a heavenly body relative to a target in a substantially coplanar second orbit, said method comprising at least the steps of:
   determining the direction of a radius from the center of gravity of said body to at least one of said spacecraft and said target;

determining a second direction substantially parallel with one of said mutually coplanar orbits and normal to said direction of a radius;

observing the angle between said second direction and a line joining said target with said spacecraft; and propelling to at least tend to maintain said angle constant.

6. A method according to claim 5 practiced with a spatial separation greater than that separation at which at least one of said target and said spacecraft appears as more than a point as observed from the other.

7. A method according to claim 5 practiced within a spatial separation at which the separation between said spacecraft and said target is such that, if said spacecraft and said target were both at the same radius, one of said target and said spacecraft would lie substantially in said second direction when viewed from the other one of said target and said spacecraft.

8. A method according to claim 5 wherein said steps of determining, observing and propelling are practiced at said spacecraft.

9. A method according to claim 5 wherein said propulsion step is selected to tend to maintain said angle at a predetermined value.

10. A method according to claim 5 wherein said substantially coplanar orbits are not fully congruent, comprising the further steps of:

noting the direction of cross-plane motion of said target relative to said spacecraft;

determining the time at which said cross-plane motion causes said line joining said target and said spacecraft to lie substantially in the plane of one of said orbits; and providing maximum propulsion at said time in a direction which is substantially normal to said plane of said one of said orbits and which opposes said cross-plane motion.

11. A method according to claim 10 further comprising the steps of:

recording the angle relative to said plane of said one of said orbits over a period of time sufficient to establish the relative motion between said target and said spacecraft;

determining the rate of change of said angle relative to said plane of said one of said orbits to produce a differentiated indicator; and propelling normal to said plane of said one of said orbits in said direction opposing said cross-plane motion in proportion to said differentiated indicator.

* * * * *